(12) United States Patent
Berlin et al.

(10) Patent No.: US 10,836,136 B2
(45) Date of Patent: Nov. 17, 2020

(54) PROCESS AND DEVICE FOR PRODUCING A FIBRE COMPOSITE MATERIAL

(71) Applicant: Evonik Operations GmbH, Essen (DE)

(72) Inventors: Mark Reinhard Berlin, Esslingen (DE); Udo Sondermann, Dorsten (DE)

(73) Assignee: Evonik Operations GmbH, Essen (DE)

( * ) Notice: Subject to any disclaimer, the term of this patent is extended or adjusted under 35 U.S.C. 154(b) by 235 days.

(21) Appl. No.: 15/562,942

(22) PCT Filed: Mar. 24, 2016

(86) PCT No.: PCT/EP2016/056585
§ 371 (c)(1),
(2) Date: Sep. 29, 2017

(87) PCT Pub. No.: WO2016/156222
PCT Pub. Date: Oct. 6, 2016

(65) Prior Publication Data
US 2018/0111350 A1   Apr. 26, 2018

(30) Foreign Application Priority Data
Apr. 2, 2015   (EP) .................................... 15162335

(51) Int. Cl.
*B32B 5/26*        (2006.01)
*B29C 70/52*       (2006.01)
(Continued)

(52) U.S. Cl.
CPC .............. *B32B 5/26* (2013.01); *B29B 15/122* (2013.01); *B29C 65/524* (2013.01); *B29C 66/41* (2013.01);
(Continued)

(58) Field of Classification Search
CPC ........ B32B 5/26; B29C 70/523; B29C 70/526
See application file for complete search history.

(56) References Cited

U.S. PATENT DOCUMENTS 3,235,437 A * 2/1966 Varlet ..................... B29C 70/04
156/551
3,415,920 A * 12/1968 Lee ......................... B29C 48/30
264/173.13
(Continued)

FOREIGN PATENT DOCUMENTS

CN   101786330 A   7/2010
CN   102367003   †   3/2012
(Continued)

OTHER PUBLICATIONS

International Search Report dated Jul. 4, 2016 in PCT/EP2016/056585 filed Mar. 24, 2016.
(Continued)

*Primary Examiner* — Matthew J Daniels
*Assistant Examiner* — Wayne K. Swier
(74) *Attorney, Agent, or Firm* — Oblon, McClelland, Maier & Neustadt, L.L.P.

(57) ABSTRACT

By use of a process for the production of a fibre-composite material, comprising the following steps:
 a) one or more fibre bundle(s) is/are drawn by way of one or more spreader device(s) into an impregnation chamber in such a way as to give at least two mutually superposed, spatially separate and spread fibre webs;
 b) melt is introduced by way of horizontally oriented distributor bars, in each case arranged between two fibre webs;
 c) the individual fibre webs are caused to converge in such a way that they are mutually superposed and contact one another;

(Continued)

d) after the fibre webs have converged they are drawn, at the end of the operating unit, through a take-off die where the first shaping takes place, and also by use of a corresponding device, very good impregnation quality is achieved through a specific wetting method implemented after a high degree of expanding, and also through subsequent relative longitudinal and transverse movements of the individual fibres.

11 Claims, 3 Drawing Sheets

(51) Int. Cl.
| | |
|---|---|
| B29B 15/12 | (2006.01) |
| B29C 65/52 | (2006.01) |
| B29C 65/00 | (2006.01) |
| B32B 37/00 | (2006.01) |
| B32B 37/12 | (2006.01) |
| B29L 9/00 | (2006.01) |

(52) U.S. Cl.
CPC ........ *B29C 70/523* (2013.01); *B32B 37/0046* (2013.01); *B32B 37/1284* (2013.01); *B29K 2713/00* (2013.01); *B29L 2009/00* (2013.01); *B32B 2305/10* (2013.01)

(56) References Cited

U.S. PATENT DOCUMENTS

| | | | | |
|---|---|---|---|---|
| 3,503,371 | A | * | 3/1970 | Meyers ................... D06B 3/04 118/405 |
| 3,959,431 | A | * | 5/1976 | Nissel ................... B29C 48/30 264/173.12 |
| 4,059,068 | A | | 11/1977 | Guillermin et al. |
| 4,164,439 | A | * | 8/1979 | Coonrod ............. B29D 28/005 156/441 |
| 5,054,705 | A | † | 10/1991 | Smith |
| 5,055,242 | A | † | 10/1991 | Vane |
| 5,122,420 | A | | 6/1992 | Baron et al. |
| 5,167,894 | A | † | 12/1992 | Baumgarten |
| 5,338,789 | A | | 8/1994 | Grosse-Puppendahl et al. |
| 5,766,357 | A | * | 6/1998 | Packer ................. B29B 15/122 118/307 |
| 5,798,068 | A | | 8/1998 | Vlug |
| 5,936,861 | A | * | 8/1999 | Jang ..................... B29C 70/384 700/98 |
| 5,942,307 | A | | 8/1999 | Hellermann et al. |
| 7,547,361 | B2 | | 6/2009 | Lo et al. |
| 8,343,410 | B2 | | 1/2013 | Herbeck et al. |
| 8,455,090 | B2 | | 6/2013 | Schmidt et al. |
| 8,920,693 | B2 | * | 12/2014 | Bledzki ................... B29B 9/06 264/172.11 |
| 9,169,363 | B2 | | 10/2015 | Schmidt et al. |
| 2005/0221085 | A1 | | 10/2005 | Lo et al. |
| 2007/0227646 | A1 | * | 10/2007 | Yano ....................... B29C 70/50 156/180 |
| 2013/0106014 | A1 | * | 5/2013 | Ishibashi ............... B29B 15/125 264/103 |
| 2013/0113133 | A1 | * | 5/2013 | Kashikar ................ B29B 15/14 264/136 |
| 2014/0309365 | A1 | | 10/2014 | Beck et al. |

FOREIGN PATENT DOCUMENTS

| | | | |
|---|---|---|---|
| CN | 103764890 A | | 4/2014 |
| CN | 102367003 B | | 8/2014 |
| DE | 10 2010 008 100 A1 | | 8/2011 |
| EP | 0 056 703 A1 | | 7/1982 |
| EP | 0 397 506 A2 | | 11/1990 |
| EP | 0 415 517 B1 | | 8/1993 |
| EP | 2 589 475 A1 | | 5/2013 |
| JP | 7-40341 A | | 2/1995 |
| JP | 2004-292604 A | | 10/2004 |
| JP | 2004292604 A | † | 10/2004 |
| WO | WO 2009/074490 A1 | | 6/2009 |
| WO | 2012002417 A1 | † | 1/2012 |
| WO | 2012120064 A | † | 9/2012 |
| WO | 2012149129 | † | 11/2012 |
| WO | WO 2012/149129 A1 | | 11/2012 |

OTHER PUBLICATIONS

Extended European Search Report dated Sep. 14, 2015 in Patent Application No. 15162335.2 (with English translation of categories of cited documents).

U.S. Appl. No. 07/591,891, filed Oct. 2, 1990, Thomas Grosse-Puppendahl et al.

U.S. Appl. No. 13/256,394, filed Sep. 13, 2011, US 2012-0003891 A1, Friedrich Georg Schmidt et al.

U.S. Appl. No. 13/973,425, filed Aug. 22, 2013, US 2014-0065911 A1, Friedrich Georg Schmidt et al.

U.S. Appl. No. 13/695,652, filed Nov. 1, 2012, US 2013-0045652 A1, Friedrich Georg Schmidt et al.

U.S. Appl. No. 13/825,728, filed Mar. 22, 2013, US 2013-0303042 A1, Friedrich Georg Schmidt et al.

U.S. Appl. No. 13/824,035, filed May 22, 2013, US 2013-0230716 A1, Friedrich Georg Schmidt et al.

U.S. Appl. No. 13/824,064, filed May 9, 2013, US 2013-0231017 A1, Friedrich Georg Schmidt et al.

U.S. Appl. No. 13/978,059, filed Aug. 21, 2013, US 2013-0323993 A1, Guenter Schmitt et al.

U.S. Appl. No. 14/774,395, filed Sep. 10, 2015, US 2016-0023384 A1, Emmanouil Spyrou et al.

U.S. Appl. No. 14/953,073, filed Nov. 27, 2015, US 2016-0152825 A1, Rainer Lomoelder et al.

U.S. Appl. No. 15/329,106, filed Jan. 25, 2017, US 2017-0226300 A1, Sandra Reemers et al.

U.S. Appl. No. 15/540,861, filed Jun. 29, 2017, Mark Reinhard Berlin et al.

U.S. Appl. No. 15/509,294, filed Mar. 7, 2017, Michael Kube et al.

U.S. Appl. No. 15/522,050, filed Apr. 26, 2017, Sebastian Buehler et al.

\* cited by examiner
† cited by third party

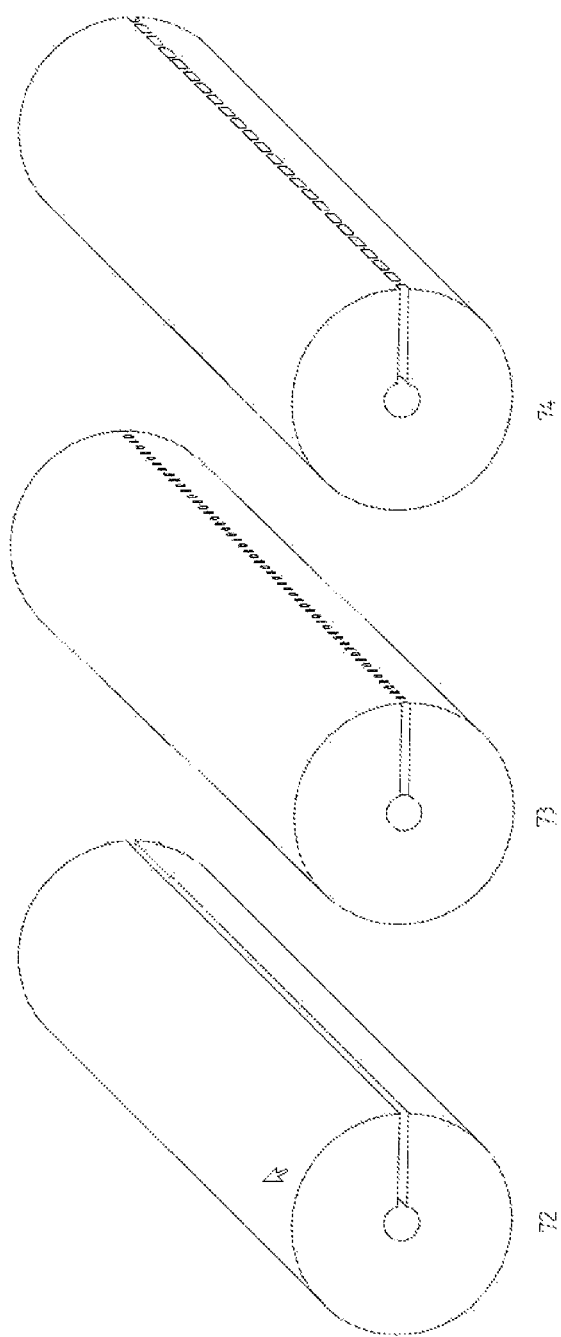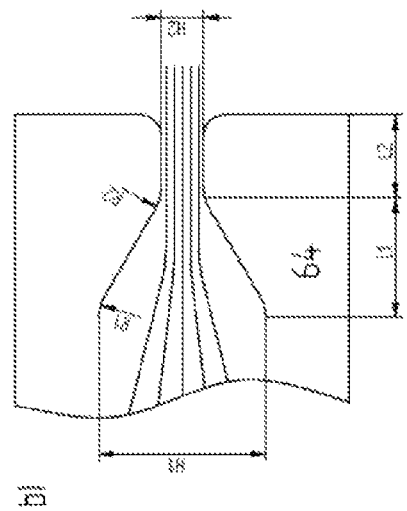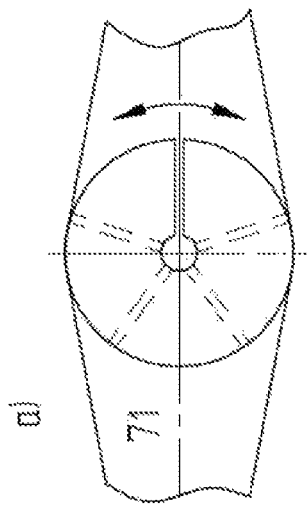

PROCESS AND DEVICE FOR PRODUCING A FIBRE COMPOSITE MATERIAL

The invention relates to a process for the production of composite materials, and also to a device which can impregnate one or more fibre bundles with a melt. The specific design permits processing of various fibre materials and fibre types, even those with relatively high tex value (e.g. heavy tows). The particular feature is achievement of robust individual-fibre impregnation over a very wide viscosity range. Unlike in the prior-art solutions in common use, it is therefore also possible to process relatively high-viscosity systems.

The expanding of a fibre bundle during melt impregnation is known. EP 0 056 703 A1 describes a process in which reinforcement-fibre rovings are drawn through a thermoplastic melt into which at least one heated surface in the form of a heated spreader bar has been immersed in order to spread the rovings. However, in practice there is always a need for a plurality of spreader devices. The take-off forces that have to be applied increase greatly with the number of spreader devices, with the viscosity of the melt and with take-off velocity. Since the resultant high take-off forces, and also the mechanical friction on the bars, damage the reinforcement fibre and thus impair the properties of the composite material, this method has very restricted time window for use. An additional factor is that the quality of impregnation, and with this also the quality of the products, decrease with increasing melt viscosity and increasing take-off velocity. The process of EP 0 056 703 A1 therefore gives good results only with melt viscosities up to 30 Pas and with low take-off velocities (below 0.3 m/min).

Low matrix viscosity can give more effective impregnation. The higher the viscosity, the less effective the impregnation. Possible ways of mitigating this effect give solutions with very low process velocities, or use a very large number of deflection points which cause substantial fibre damage and likewise retard the process. Some technical solutions use a round deflector unit with integrated die for matrix application; spread fibre rovings are drawn individually or as web product over the same. Wetting and impregnation take place here in one step. For very simple processes or very low matrix viscosities this can achieve an adequate impregnation effect. Web velocity is subject to restriction depending on roller arrangement, since otherwise fibre damage increases unacceptably, or else impregnation is inadequate. This method is the subject matter of many patent applications; examples that may be mentioned are U.S. Pat. Nos. 4,059,068, 5,798,068, WO 2009/074490, US 2005/0221085 and EP 0 397 506 A2. In an alternative to this it is possible to achieve application by way of rigid deflection points (EP 0 415 517 A1).

In contrast to the above, it is an object of the present invention to solve the abovementioned problems and in particular to provide a process in which a high degree of impregnation can be achieved in a simple manner with short residence time of the melt, while fibre damage can be avoided and nevertheless a high take-off velocity can be achieved. The process should lead to very good impregnation quality in particular for a large range of fibre types, and also for relatively high matrix viscosities. The expression very good impregnation quality means that very finely distributed individual filament fibres are present, and ideally matrix completely surrounds each individual one of these, and there are almost no non-impregnated filament bundles or filament domains present. There are moreover also almost no air inclusions present in the product. Impregnation quality is assessed in the usual way by using microsections or scanning electron micrographs.

This object is achieved via a process for the production of a composite material which realises a specific combination of wetting method and further impregnation. The process comprises the following steps:
a) one or more fibre bundle(s) is/are drawn by way of one or more spreader device(s) into an impregnation chamber in such a way as to give at least two mutually superposed, spatially separate and spread fibre webs;
b) melt is introduced by way of horizontally oriented distributor bars, in each case arranged between two fibre webs;
c) the individual fibre webs are caused to converge in such a way that they are mutually superposed and contact one another;
d) after the fibre webs have converged they are drawn, at the end of the operating unit, through a take-off die where the first shaping takes place.

The product can then be calendered and cooled.

The expression "fibre bundle" means a bundle made of a relatively large number of individual filaments. Several thousand individual filaments are usually involved here. The fibre bundle can be composed of one roving or else of a plurality of rovings; it is preferably composed of from 1 to at most 1000 rovings, and is particularly preferably composed of from 1 to at most 800 rovings. In the process of the invention, these rovings are individually unwound or drawn off from packages and, prior to the spreader device or at the beginning of the spreader device, are caused to converge in such a way as to give a single fibre bundle. The term "roving" here generally means a bundle of single filaments; this bundle can be composed of a single fibre type or else of various fibre types. In principle all fibres of adequate length are suitable; it is possible to use inorganic fibres, polymer fibres, and also natural fibres. Examples of suitable fibres are metal fibres, glass fibres (e.g. made of E glass, A glass, C glass, D glass, AR glass, R glass, S1 glass, S2 glass, etc.), carbon fibres, metallized carbon fibres, boron fibres, ceramic fibres (e.g. made of $Al_2O_3$ or $SiO_2$), basalt fibres, silicon carbide fibres, aramid fibres, polyamide fibres, polyethylene fibres, polyester fibres (e.g. made of polybutyleneterephthalate), fibres made of liquid-crystalline polyester, polyacrylonitrile fibres, and also fibres made of polyimide, polyetherimide, polyphenylene sulphide, polyether ketone, polyether ether ketone, and also cellulose fibres, these having been spun by means of the viscose process and usually being termed viscose fibres, hemp fibres, flax fibres, jute fibres and the like. The cross section of the fibres can by way of example be circular, rectangular, oval, elliptical, or of irregular rounded shape. With fibres of cross section deviating from the circular shape (for example flat glass fibres) it is possible to achieve a higher fill level of fibre in the finished part, and thus higher strength.

The fibre bundle is expanded and is conducted in such a way as to give, at the latest during melt application, at least two mutually superposed webs. Web separation can take place in the operating unit or else prior to the operating unit.

In one preferred embodiment, at least two fibre bundles are respectively separately spread by way of a spreader device and are drawn through separate apertures into an impregnation chamber. Two spatially separate fibre webs are thus obtained directly.

The arrangement here advantageously has the fibre bundles, the spreader devices and the intake apertures over one another in such a way that no deflection of the fibre webs is necessary. In specific cases, however, the arrangement of the fibre bundles, the spreader devices and the intake apertures can also be different, thus requiring deflection of the fibre webs into the appropriate position.

In another preferred embodiment, at least two fibre bundles are respectively separately expanded by way of a spreader device, and are drawn through the same aperture into an impregnation chamber. On entry into the impregnation chamber, the individual fibre webs again divide. The division of the previously separated webs can be achieved by manual threading in the opened operating unit. Preference is therefore given to an at least two-part operating unit that is easy to open.

In another embodiment, a fibre bundle is expanded by way of a spreader device and here or hereafter is separated by a suitable device into a plurality of mutually superposed, spatially separate and spread fibre webs. However, the separated fibre webs here require deflection. The fibre webs are then drawn into an impregnation chamber. In a variant here, two or more fibre bundles are respectively separately expanded by way of a spreader device, and here or hereafter separated by a suitable device respectively into a plurality of mutually superposed, spatially separate and spread fibre webs, and these are deflected and then drawn into an impregnation chamber.

It is also possible for the purposes of the invention to combine these various embodiments as desired.

The expanding in step a) is dependent on the shape of the final product. If the final product is a tape, the expanding factor for the fibre bundle is comparatively high. If, in contrast, the final product is relatively thick, for example has a rectangular or square cross section, the expanding factor for the fibre bundle, based on the width of the final product, can be comparatively low; it is therefore not possible to state any useful generally applicable upper limit. The expanding factor depends on the shape of the final product and can preferably be at most 30, particularly preferably at most 20, with particular preference at most 14 and very particularly preferably at most 8, based in each case on the original width of the fibre bundle. In particular in the case of relatively thick final products it can be useful for the number of mutually superposed webs caused to converge to be more than two.

It is preferable here that the extent of expanding of the fibre bundles is sufficient that the average thickness thereof is from 1 to 50 times the filament diameter, particularly from 1 to 40 times the filament diameter, in particular from 1.5 to 35 times the filament diameter and very particularly from 1.8 to 30 times the filament diameter. The data here are averaged across the width of the fibre web. In the case of fibres with non-circular cross section, the shortest cross-sectional axis is selected as filament diameter. In respect of the fibre cross section, the information provided by the fibre manufacturer can be used. In the case of a mixture of various fibres, the arithmetic average based on the number of individual filaments is selected as filament diameter. When manufacturers' information is not available, or in the case of fibres of identical type with different shape, for example natural fibres, the average filament diameter is determined via a scanning electron micrograph (SEM), and measurement and calculation of the arithmetic average based on the number of individual filaments.

Suitable spreader devices for the expanding of the fibre bundle(s) are known to the person skilled in the art. By way of example, at least one deflector bar is used for this purpose. A practical arrangement has a plurality of deflector bars in succession, for example two, three or four.

The matrix of the composite material can be a thermoplastic moulding composition, a thermoset, a thermoplastic-thermoset hybrid system, a thermoplastic elastomer or a crosslinked elastomer.

Thermoplastic moulding compositions are composed of a thermoplastic as main constituent or sole constituent. Other constituents can by way of example be stabilizers, processing aids, pigments, flame retardants, other thermoplastics as blend components, impact modifiers or the like. Examples of suitable thermoplastics are polyolefins (such as polyethylene and polypropylene), polyesters (such as polyethylene terephthalate, polybutylene terephthalate, polyarylates and liquid-crystalline polyesters), polycarbonate, polyester carbonate, polyamides (such as PA46, PA6, PA66, PA610, PA612, PA1010, PA11, PA12), semiaromatic polyamides (PPA) and transparent polyamides, for example those based on linear or branched aliphatic, cycloaliphatic or aromatic dicarboxylic acids and diamines), polyarylene ether ketones (such as polyether ether ketone, polyether ketone or polyether ether ketone ketone), polyphenylene sulphide, polyetherimide, polymethyl methacrylate, polystyrene, styrene-acrylonitrile copolymers (SAN), styrene-acrylonitrile-butadiene copolymers (ABS), polyacetal, polyurethane, polyimide, polysulphone, polyether sulphone, polyphenylene oxide and fluoropolymers (such as PVDF or ETFE). Thermoplastic is usually applied as melt. This melt can also comprise a solvent which is subsequently removed. However, it is also possible instead to apply a monomer as melt which is then polymerized in situ; it is thus possible by way of example to produce a polyamide matrix via anionic lactam polymerization. Another variant consists in applying a polymer with comparatively low molecular weight together with a coupling agent as melt, and then carrying out a chain extension during the impregnation procedure and in particular thereafter.

Suitable thermosets are by way of example unsaturated polyester resins, epoxy resins, amino plastics, phenolic plastics, crosslinked polyacrylates, polyurethanes, melamine resins, vinyl ester resins and bismaleimide resins. The melt applied in the process step b) is in this case a resin-hardener mixture or any other suitable precursor, for example a prepolymer.

Suitable thermoplastic elastomers are by way of example TPEO (thermoplastic elastomers based on olefin, for example PP/EPDM), TPEV (crosslinked thermoplastic elastomers based on olefin, in particular PP/crosslinked EPDM), TPEU (thermoplastic elastomers based on polyurethane), TPEE (thermoplastic polyester elastomers), TPES (styrene block copolymers, for example SBS, SEBS, SEPS, SEEPS and MBS), and also TPEA (polyamide elastomers).

Suitable crosslinked elastomers are obtained from a compounded rubber material which, as in the prior art, comprises a vulcanizing agent, and also optionally comprises vulcanization auxiliaries, fillers, oils, and also other conventional additions. Examples of elastomers of this type are EPDM, styrene/butadiene rubber, butyl rubber, silicone rubber, epoxy rubber, chloroprene rubber, acrylic rubber and the like.

For the purposes of the invention, the term "melt" is used for any of the flowable materials mentioned above by way of example that are applied to the fibre bundles and then provide the matrix.

In process step a), a plurality of fibre webs are produced with a very small increase in height. A significant reduction of the weight per unit area is desired. The precise weight per unit area, and also the number of webs, depends on the desired subsequent product structure and on the matrix material used and, respectively, the viscosity of the melt. It is preferable that either the width of the web corresponds to the width of the subsequent product or a higher degree of expanding can take place in order that the wetting procedure is further facilitated. When the fibre webs proceed into the impregnation chamber they do so together by way of a shared intake, or separately.

The wetting procedure then takes place between the respective fibre webs, where the cross section of a distributor serves to introduce the melt. As required by the properties desired in the subsequent product, and also by the starting materials used, the arrangement can comprise one or more melt distributors, preferably mutually superposed. Melt is supplied from an extruder, or from a melt pump downstream of a plastifying unit, to a distributor bar which meters the polymer uniformly over the cross section of the web. This uniform metering is achieved by way of the internal cross section of the applicator die. The shape of the distributor die provides uniform application of the melt in that there is a die aperture or a plurality of adjacent die apertures preferably present over the entire width of the fibre webs. A T-bar distributor can be used here, or a manifold distributor, or any other type that permits controlled metering, and also uniform application of the melt film. These distributor dies are known to the person skilled in the art. A suitable manifold distributor is described in more detail by way of example in WO 2012/149129. The cross section of the distributor bar can by way of example be round, oval, elliptical, rectangular or rounded-rectangular.

For the purposes of the invention it is additionally possible to apply further melt via one or two applicator dies, where the arrangement has either an applicator die above the uppermost fibre web, an applicator die below the undermost fibre web, or respectively an applicator die above the uppermost fibre web and below the undermost fibre web.

In the impregnation step that follows, the various webs are caused to converge and are drawn through a die. In the chamber region between melt application and die, assistance can be provided by the presence of a slight excess of melt. In this region the fibre webs converge, and the applied melt penetrates into the spaces between the fibres where impregnation has not yet taken place. This procedure is assisted by local differences of pressure that can be caused by the convergence in the region of the die. In the region of the chamber, the convergence can also be assisted by the shape of the chamber, or by an insert introduced in the form of a narrowing of cross section. In this case, the fibres are subjected to preconsolidation with melt in a preliminary stage; the remaining consolidation is then carried out by the die. If the final product is a thin sheet, it is likely that no narrowing of cross section is required; in contrast, if it is a profile the cross section is reduced from that of an expanded fibre web to that corresponding to the shape of the profile.

The take-off die carries out the initial shaping, and brings about further impregnation of the web product. It does not generally comprise any integrated take-off equipment. Instead, tension is usually applied to the strand by a take-off directly after the die, or by calender rolls. This type of take-off is prior art, for example in the form of rollers or rolls, as also are calenders. Further shaping can take place here.

FIG. 5 shows various embodiments of distributor bars with different distributor cross sections.

FIG. 6 depicts the manner in which the distributor bar can be positioned in order to vary melt application.

FIG. 7 is a side view of the convergence of the fibre webs prior to the take-off die.

Figure 1:
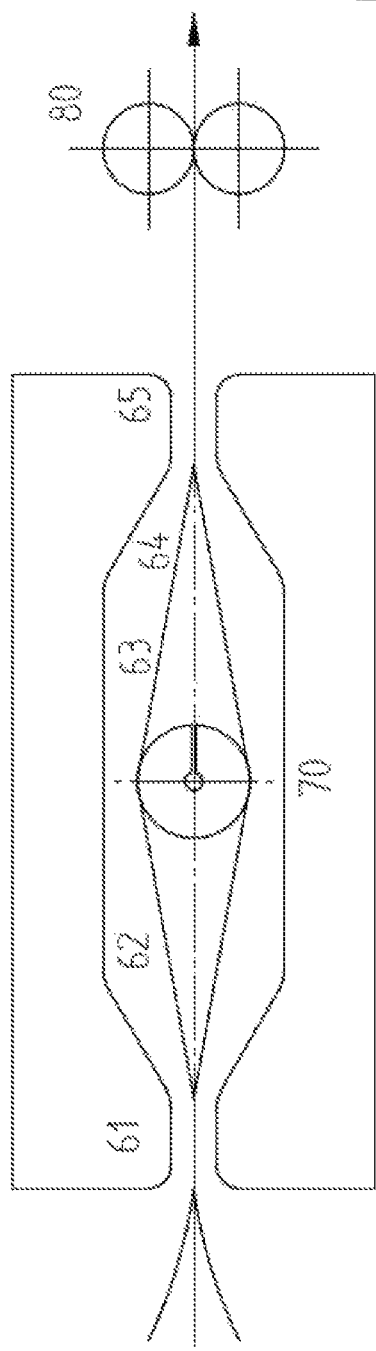
FIG. 1 depicts an embodiment of the system where separation into two mutually superposed fibre webs takes place.

FIG. 1 shows a simple embodiment. The spread fibre bundle with a previously defined number of individual filament plies enters the impregnation chamber 62 through a shaped intake 61. In the impregnation chamber, prior to the distributor bar 70, the bundle divides and thus halves its number of filament plies. The subsequent melt application via the distributor bar 70 takes place between the two substrands. In any particular embodiment, the application here can take place centrally, to the upper fibre web or to the lower fibre web (see 71 in FIG. 6. The first result of central application is to halve the distance that the melt must cover in order to achieve complete penetration of the fibres (by virtue of the halved number of filament plies). The two plies then converge again to give one ply. In the simple embodiment shown here, this is achieved without assistance. However, the operating unit can also comprise an additional geometric design feature which assists this convergence before the material leaves the chamber section 63 (first convergence region). A simple example of this would be guide bars or, within the operating unit, a narrowing which causes convergence of the plies (not shown here). The consolidation region 64 in the rear part of the impregnation chamber begins the transition from the geometry of the chamber to the subsequent shaping through the cross section of the die (see also FIG. 7). The shaping takes place in the take-off die 65. By virtue of the narrowed cross section, the matrix material is then forced through the fibre bed. If there is a slight excess of melt, the narrowing that occurs shortly before this (dependent on the respective shape at the end of the die) causes a local pressure rise, and this then provides general assistance in achievement of the impregnation. The fibres are thus saturated by matrix material from above, from below, and centrally, and are consolidated. The convergence of the bundles, the pressure increase and the shaping moreover cause constant relative movement of the individual filaments, and this permits full consolidation. For final shaping, the profile can also be calendered by means of a calender 80 after take-off. The resultant strand is then either cooled and wound or chopped to length; as an alternative to this it can be further processed immediately, e.g. by winding around a core and then cooling (in the case of a thermoplastic matrix) or then hardening (in the case of a thermoset matrix).

Figure 2:
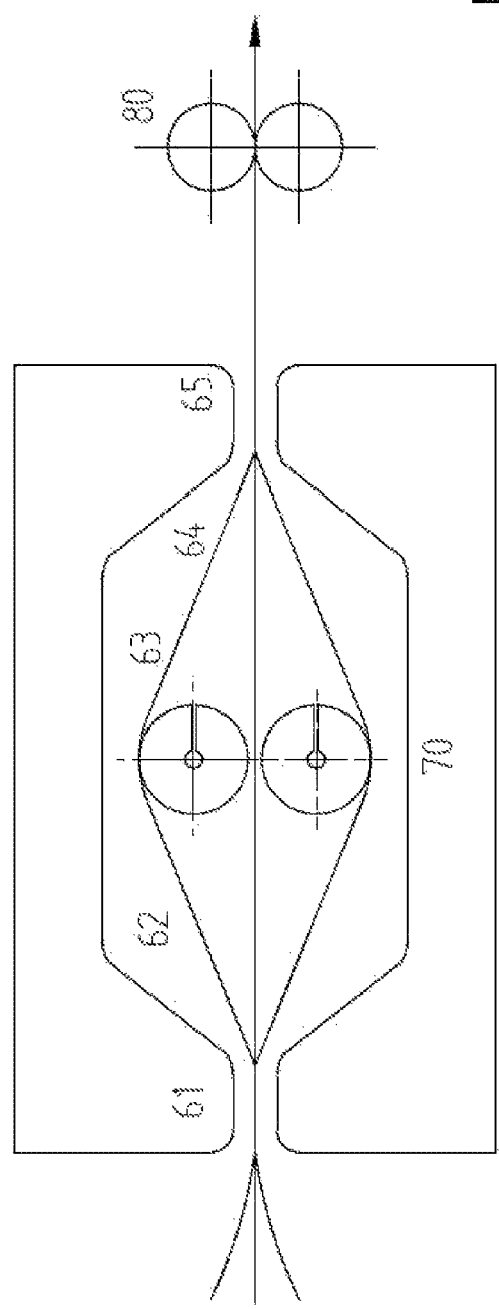
FIG. 2 depicts another embodiment of the system where separation into three mutually superposed fibre webs takes place.

FIG. 2 shows an embodiment in which the fibre bundle is divided into three fibre webs. Melt is applied via a distributor bar between each two fibre webs. In other respects, the principles of the embodiments relating to FIG. 1 are applicable.

Figure 3:
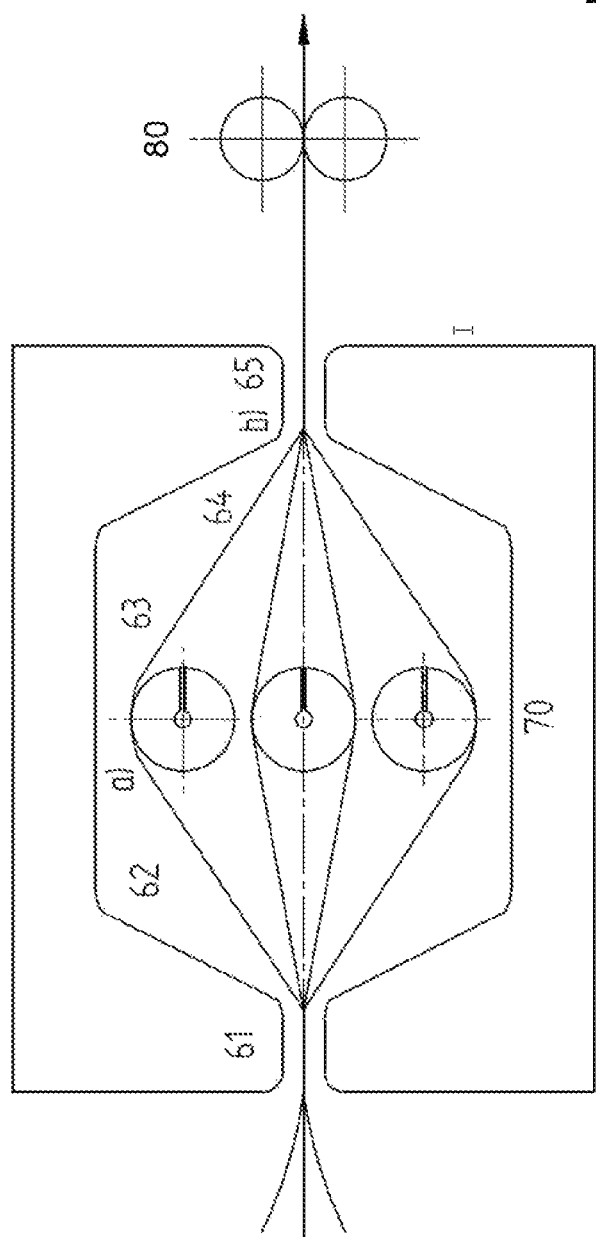
FIG. 3 depicts another embodiment of the system where separation into four mutually superposed fibre webs takes place.

FIG. 3 shows another embodiment in which the fibre bundle is divided into four fibre webs. Melt is applied via a distributor bar between each two fibre webs. In other respects, the principles of the embodiments relating to FIG. 1 are applicable.

Figure 4:
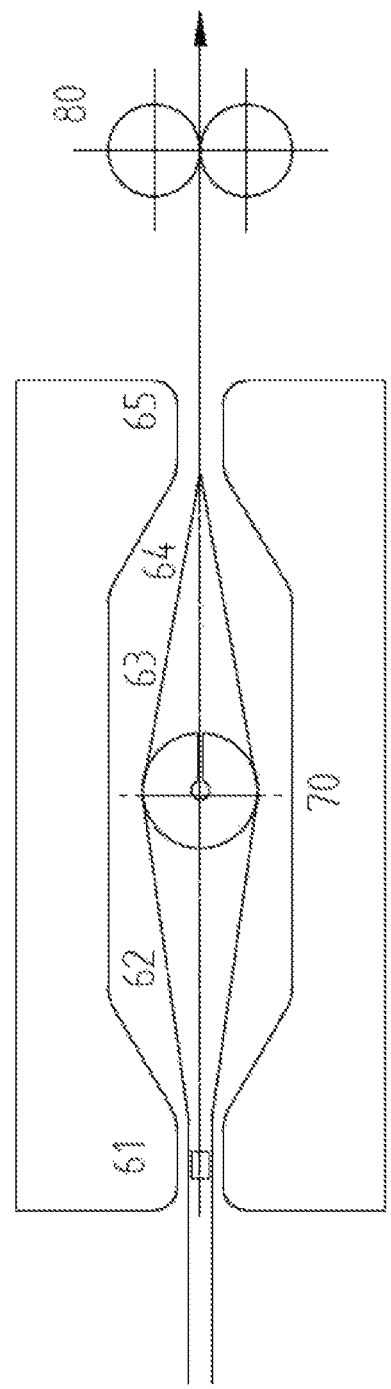
FIG. 4 shows one variant of the intake of the individual fibre webs.

FIG. 4 shows how the spread fibre webs can be drawn separately into the system, unlike in FIGS. 1 to 3, where the spread fibre webs are drawn together into the system while in contact with one another.

FIG. 5 shows various embodiments of the distributor bar where the apertures have been designed to be appropriate to the viscosity of the melt.

FIG. 6 shows how, in particular embodiments, melt application via the distributor bar 71 can take place centrally, to the upper fibre web or to the lower fibre web. The distributor bar here is used simultaneously as deflector and as fibre guide. If the melt is metered into the space prior to the distributor bar, this assists achievement of the impregnation through local pressure increase.

FIG. 7 describes the convergence of the fibre webs prior to the take-off die. It is possible here to set a precise pressure profile, depending on the selected narrowing ratio of cavity height to die height (H1:H2), the selected degree of narrowing, controllable mainly by way of the length L1, and also the selected transition radii R1 and R2. This is important for the product consolidation process because it is desirable to achieve a slow and controllable pressure increase without pressure peaks (of the type obtained with sudden narrowing). L2 is the length of the take-off die.

The preferred viscosity of the melt applied in the process of the invention is from 10 mPas to 400 Pas, and particularly up to 300 Pas. In the case of prepolymers or resin-hardener systems which, after curing, give thermosets or thermoplastic-thermoset hybrid systems, viscosity is in the lower range down to 10 mPas or even lower. In the case of a melt made of a thermoplastic moulding composition, a thermoplastic elastomer or a compounded elastomer material viscosity is generally at least 1 Pas. According to the invention, viscosity is the zero-shear viscosity at the temperature of the process, measured in accordance with ASTM D4400 in a mechanical spectrometer.

Operations during application of the melt generally avoid any excess of melt, in particular in the case of relatively high-viscosity melts, or use only a small excess of melt. When operations are carried out with excess of melt, the excess accumulates in the region towards the die, and forms a melt bath. Precautionary measures must be taken in this case to enable the excess melt to flow out through an aperture provided for this purpose. The ratio of fibres to melt is adjusted in such a way that the proportion by volume of the fibres in the finished part is about 10 to 85%, preferably 15 to 80% and particularly preferably 20 to 75%.

If melt applied comprises a resin-hardener system, a monomer or a prepolymer, the hardening reaction takes place in the die region, and also thereafter. In this case, the die region can have been designed to be longer. Operations are either carried out with quantitatively appropriate melt application or use the die as stripper, delaying hardening until thereafter. The selected temperature profile must be such that hardening cannot take place before the die region has been reached. After draw-off from the die, the product is optionally subjected to thermal post treatment, for example in an oven, for completion of hardening.

Take-off velocity can be adjusted as required. It is preferably from 0.1 to 30 m/min and particularly preferably from 0.5 to 25 m/min.

The strand obtained in the process of the invention can have any desired shape. It can by way of example be a thin sheet or other sheet, a tape, a round profile, a rectangular profile or a complex profile.

In one variant of this process, the strand obtained, comprising a thermoplastic matrix, is chopped to give elongate long-fibre-reinforced pellets of a length from 4 to 60 mm, preferably from 5 to 50 mm, particularly preferably from 6 to 40 mm, with particular preference from 5 to 30 mm and very particularly preferably from 6 to 25 mm. These pellets can then be used to produce mouldings by means of injection moulding, extrusion, compression moulding or other familiar shaping processes, and particularly good properties of the moulding are achieved here with non-aggressive processing methods. The meaning of non-aggressive in this context is mainly substantial avoidance of disproportionate fibre breakage and the attendant severe fibre length reduction. In the case of injection moulding this means that it is preferable to use screws with large diameter and low compression ratio, and also generously dimensioned channels in the region of the nozzle and the gate. A supplementary condition that should be ensured is that the elongate pellets are melted rapidly with the aid of high cylinder temperatures (contact heating), and that the fibres are not excessively comminuted by disproportionate levels of shear. When attention is given to these measures, the mouldings obtained have higher average fibre length than comparable mouldings produced from short-fibre-reinforced moulding compositions. This gives a significant improvement of properties, in particular tensile modulus of elasticity, ultimate tensile strength and notched impact resistance.

The invention also provides a device which is intended for the production of a fibre-composite material and which comprises the following elements:

a) one or more spreader device(s) by way of which a fibre bundle can be spread to give at least two mutually superposed, spatially separate fibre webs;
b) one or more intake region(s);
c) at least one horizontally oriented distributor bar which comprises a distributor die and is arranged in such a way that its location is between two fibre webs, and which can be used to apply melt by way of the distributor die;
d) a melt chamber in which the distributor bar is arranged, and through which the fibre webs can be transported;
e) optionally a cross-sectional narrowing,
f) a convergence region and
g) a take-off die.

In one preferred embodiment, the device comprises at least two spreader devices by way of each of which it is possible to spread a fibre bundle, and also the same number of intake regions.

In another preferred embodiment, the device comprises at least two spreader devices by way of each of which a fibre bundle can be spread, and also one, and in particular only one, intake region.

In another embodiment, the device comprises an element which separates, into a plurality of mutually superposed webs, a fibre bundle spread by way of a spreader device.

It is also possible for the purposes of the invention to combine these various embodiments as desired.

Details of the said device are apparent from the process description above, because the device serves for the conduct of the process of the invention.

The process can be conducted in various modes of operation, depending on the viscosity of the melt and on the number of filament plies. It is thus possible to process even relatively high-viscosity systems as matrix material. The significant difference from previous solutions is, according to the invention, the specific wetting method implemented after a high degree of expanding, followed by impregnation of the individual fibres by virtue of relative longitudinal and transverse movements. Very good impregnation quality is thus achieved across a very wide viscosity range, even when take-off velocity is high.

KEY

61 Intake region
62 Impregnation chamber
63 First convergence region
64 Consolidation region
65 Take-off die
70 Distributor bar
71 Pivotable distributor bar
72 Shape variant of a distributor bar
73 Shape variant of a distributor bar
74 Shape variant of a distributor bar
80 Calender

The invention claimed is:

1. A process for the production of a fibre-composite material, comprising:
   a) drawing one or more fibre bundle(s) by way of one or more spreader device(s) into an impregnation chamber in such a way as to give at least two mutually superposed, spatially separate and spread fibre webs;
   b) introducing a melt by way of horizontally oriented distributor bars, in each case arranged between two fibre webs, the horizontally oriented distributor bars each being substantially cylindrical, having a round cross-section, and being pivotable about an individual central axis;
   c) rotating each horizontally oriented distributor bar about its individual central axis;
   d) causing the individual fibre webs to converge in such a way that they are mutually superposed and contact one another; and
   e) after the fibre webs have converged, drawing the fibres, at the end of the operating unit, through a take-off die where the first shaping takes place.

2. The process according to claim 1, wherein in the step a) at least two fibre bundles are respectively separately spread by way of a spreader device, and are drawn through separate apertures into an impregnation chamber.

3. The process according to claim 1, wherein in the step a) at least two fibre bundles are respectively separately spread by way of a spreader device, and drawn through the same aperture into an impregnation chamber.

4. The process according to claim 1, wherein in the step a) a fibre bundle is spread by way of a spreader device and here or hereafter is separated by a suitable device into a plurality of mutually superposed, spatially separate and spread fibre webs.

5. The process according to claim 1, wherein the matrix of the composite material is a thermoplastic moulding composition, a thermoset, a thermoplastic-thermoset hybrid system, a thermoplastic elastomer or a crosslinked elastomer.

6. The process according to claim 1, wherein in the step a) the fibre ply is spread to an extent such that its average thickness is from 1 to 50 times the filament diameter.

7. The process according to claim 1, wherein the strand obtained is calendered after leaving the take-off die.

8. The process according to claim 1, wherein the strand obtained is chopped to give elongate long-fibre-reinforced pellets of length from 4 to 60 mm.

9. The process according to claim 1, wherein the strand obtained is a thin sheet or other sheet, a tape, a round profile, a rectangular profile or a complex profile.

10. The process according to claim 1, wherein the melt is introduced through a plurality of adjacent die apertures on the horizontally oriented distributor bars.

11. The process according to claim 10, wherein the plurality of adjacent die apertures is present over the entire width of the fibre webs.

* * * * *